(12) United States Patent
Silverbrook

(10) Patent No.: US 7,349,777 B2
(45) Date of Patent: Mar. 25, 2008

(54) CAR DISPLAY CAPTURE APPARATUS

(75) Inventor: Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 132 days.

(21) Appl. No.: 10/503,929

(22) PCT Filed: Feb. 12, 2003

(86) PCT No.: PCT/AU03/00166

§ 371 (c)(1), (2), (4) Date: Aug. 9, 2004

(87) PCT Pub. No.: WO03/069513

PCT Pub. Date: Aug. 21, 2003

(65) Prior Publication Data

US 2005/0149239 A1     Jul. 7, 2005

(30) Foreign Application Priority Data

Feb. 13, 2002  (AU) ..................... PS0475

(51) Int. Cl.
*G06F 17/40* (2006.01)
(52) U.S. Cl. ............................ 701/36; 701/1
(58) Field of Classification Search ..................... None
See application file for complete search history.

(56) References Cited

U.S. PATENT DOCUMENTS

| | | | |
|---|---|---|---|
| 5,897,602 A | 4/1999 | Mizuta | |
| 6,161,066 A * | 12/2000 | Wright et al. | 701/36 |
| 6,273,310 B1 * | 8/2001 | Gregory | 224/275 |
| 6,334,664 B1 * | 1/2002 | Silverbrook | 347/32 |
| 6,518,881 B2 * | 2/2003 | Monroe | 340/539.1 |
| 6,681,195 B1 * | 1/2004 | Poland et al. | 702/142 |
| 6,690,268 B2 * | 2/2004 | Schofield et al. | 340/438 |
| 6,894,717 B2 * | 5/2005 | Bakewell | 348/149 |
| 7,120,552 B1 * | 10/2006 | Scherf et al. | 702/119 |
| 2002/0051061 A1 * | 5/2002 | Peters et al. | 348/207 |
| 2003/0107749 A1 * | 6/2003 | Aquilina | 358/1.1 |

FOREIGN PATENT DOCUMENTS

| | | |
|---|---|---|
| JP | 10-021498 | 1/1998 |
| JP | 2001-322266 | * 11/2001 |
| KR | 20-88346 | 7/2000 |
| KR | 2000-65459 | 11/2000 |
| WO | WO 99/40491 A1 | 8/1999 |
| WO | WO 00/23948 A1 | 4/2000 |

OTHER PUBLICATIONS

Derwent Abstract Accession No. 2001-220124/23, Class P75, IE 81334 B3 (Leamy O et al) Oct. 4, 2000.

* cited by examiner

*Primary Examiner*—Michael J. Zanelli

(57) ABSTRACT

An in-vehicle information retrieval system includes a data generating module for generating data within the vehicle. A data capture module is in communication with the data generating module for capturing data from the data generating module. A printing unit is mounted in the vehicle and is connected to the data capture module for printing desired information.

15 Claims, 14 Drawing Sheets

CAR DISPLAY CAPTURE APPARATUS

The present application is a 371 of PCT/AU03/00166 filed on Feb. 12, 2003, all of which is herein incorporated by reference.

FIELD OF INVENTION

The present invention relates to an in-vehicle information retrieval system and to a method of retrieving information from within a vehicle.

BACKGROUND TO INVENTION

In many modern motor vehicles, it is becoming increasingly common to incorporate some form of display facility such as an LCD panel. The LCD panel may be integrated into the car in one of a number of available locations such as above a rear-view mirror of the vehicle, in a center console or in the backrests of front seats of the vehicle. These display facilities may have a number of applications including such things as television, viewing of DVD or video content, vehicle navigation systems or video game displays.

Currently, any displayed image may only appear on the LCD for as long as the video source outputs that image. This means that, if information that viewer deemed to be useful was presented in some form on the LCD, and the viewer decided that information was to be revisited at some later time, then the viewer would either need to copy the information by writing it down or trying to remember the content.

CO-PENDING APPLICATIONS

Various methods, systems and apparatus relating to the present invention are disclosed in the following co-pending applications filed by the applicant or assignee of the present invention on 12 Feb. 2003:

| | | | | | |
|---|---|---|---|---|---|
| 10/503886 | 7144107 | 10/503900 | 10/503898 | 10/503897 | 10/503920 |
| 10/503921 | 10/503924 | 7108437 | 7140792 | 10/503922 | 10/503923 |
| 10/503917 | 10/503918 | 10/503925 | 10/503927 | 10/503928 | 10/503929 |
| 10/503885 | 10/503884 | 10/503919 | 7150523 | 10/503889 | 10/503890 |
| 10/503891 | 7150524 | | | | |

The disclosures of these co-pending applications are incorporated herein by cross-reference.

SUMMARY OF INVENTION

According to a first aspect of the invention, there is provided an in-vehicle information retrieval system, the system including:

a data generating module for generating data within the vehicle;

a data capture module in communication with the data generating module for capturing data from the data generating module; and a printing unit, mounted in the vehicle and connected to the data capture module, for printing information from the data capture module.

The data generating module may generate image data. The image data may include text data. Preferably, the image data includes video data.

The data generating module may include a display means on which the video data are displayed.

The data capture module may include an image capture unit. Further, the data capture module may include a user terminal associated with the image capture unit, the user terminal being operable by a user to cause data to be captured on demand. The image capture unit may encode data from the data generating module into a suitable format for printing.

The printing unit may include a printer and a printer controller in communication with the image capture unit, the printer controller receiving said formatted data from the image capture unit.

The printer may be a full color printer. Preferably, the printer is a photo quality color printer.

Further, the printer may be an ink jet printer. Thus, the printer may comprise a pagewidth inkjet printhead. The printhead may comprise an array of nozzles, said array being fabricated by microelectromechanical techniques.

The system may include a communications unit which communicates with the data capture module for enabling captured data to be sent to a remote location. The communications unit may also communicate with the data generating module for enabling the data generating module to generate data from a remote supplier of the data.

According to a second aspect of the invention, there is provided a method of retrieving information from within a vehicle, the method including the steps of:

generating data within the vehicle;

capturing at least certain of the generated data; and printing desired captured data via a printing unit mounted in the vehicle.

The method may include generating image data including video data. Then, the method may include displaying the video data.

The method may include causing data to be captured on demand.

Further, the method may include encoding data into a suitable format for printing. Where the data include video data, the method may include encoding the data into a compressed image format The method may include including supplementary information in the compressed image format.

Additionally, the method may include sending captured data to a remote location and may also include generating data sourced from a remote supplier of the data.

According to a third aspect of the invention, there is provided an in-vehicle information retrieval system which includes:

an onboard viewing facility;

a control means associated with the image viewing facility for controlling data displayed on the image viewing facility; and an onboard printing unit, connected to the image viewing facility, for enabling an image to be printed.

In this specification, unless the context clearly indicates otherwise, the term "onboard" is to be understood in a broad sense as a device and its components which are mounted on or in the vehicle.

According to a fourth aspect of the invention, there is provided a method of retrieving information from within a vehicle, the method including the steps of:

viewing images on an onboard viewing facility;

controlling images displayed on the image viewing facility, and printing a desired image via an onboard printing unit.

According to a fifth aspect of the invention, there is provided an in-vehicle information retrieval system which includes:

an onboard image viewing facility including an image output module and a display means for viewing the images;

an image capture unit, in communication with the image viewing facility, the image capture unit including a data compression means for compressing data relating to a captured image into a suitable format for printing; and an onboard printing unit connected to the image capture unit for enabling said captured image to be printed.

The system may include a wireless communications unit connected to the image capture unit for sending said captured image to a remote location. The wireless communications unit may also be connected to the image viewing facility for enabling video images to be downloaded from a remote supplier of said video images.

According to a sixth aspect of the invention, there is provided a method of retrieving information from within a vehicle, the method including the steps of:

viewing images on an onboard image viewing facility including an image output module and a display means;

compressing data relating to a captured image into a suitable format for printing; and printing a desired image via an onboard printing unit The method may include sending said captured image to a remote location by means of a wireless communications unit. Further, the method may include downloading video images from a remote supplier of said video images to the image viewing facility by means of the wireless communications unit.

BRIEF DESCRIPTION OF THE DRAWINGS

The invention will now be described, by way of example only, with reference to the accompanying drawings, in which.

DETAILED DESCRIPTION OF THE PREFERRED EMBODIMENT

Figure 1:
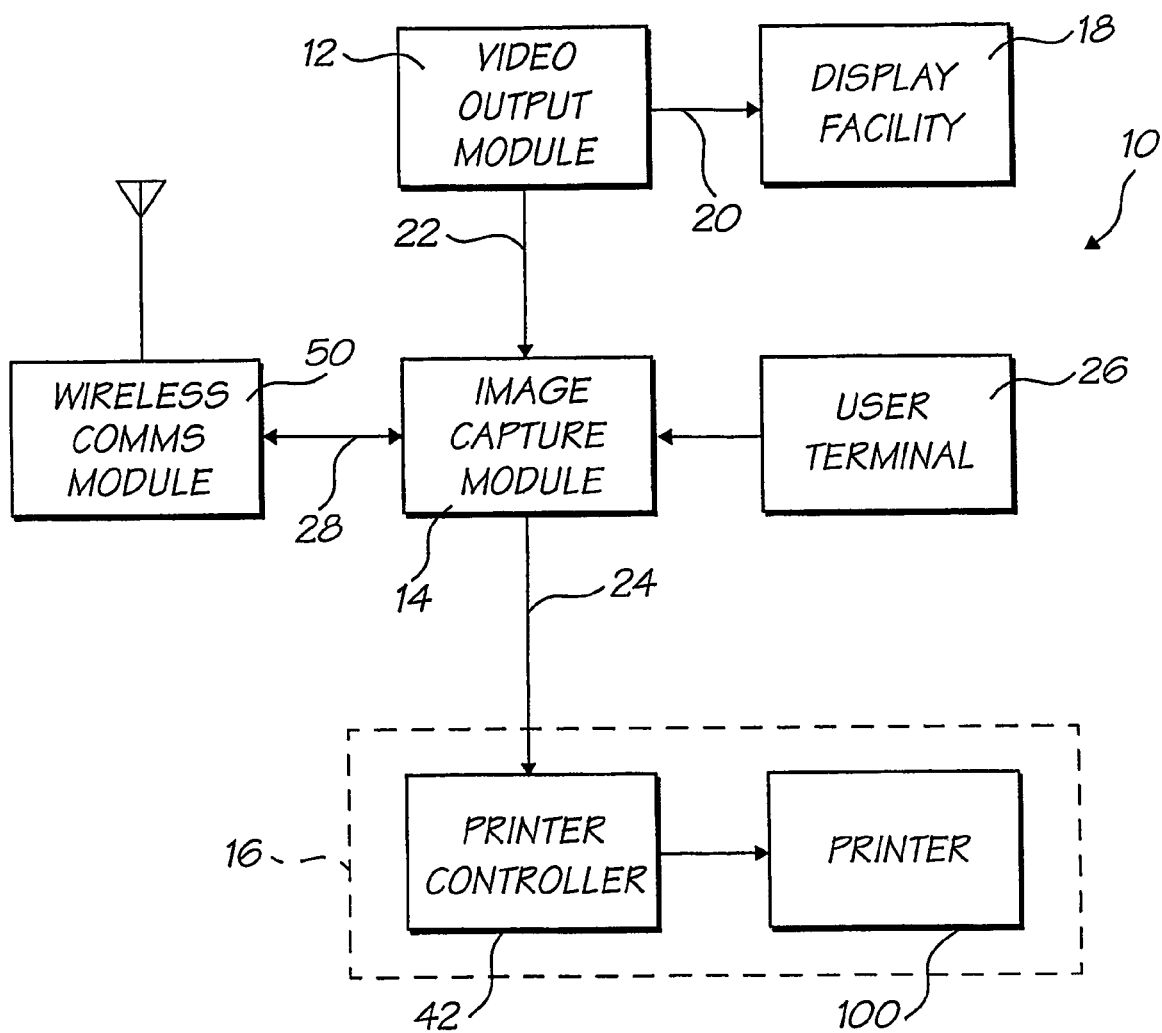
FIG. 1 shows a block diagram of an in-vehicle information retrieval system, in accordance with the invention.
Figure 2:
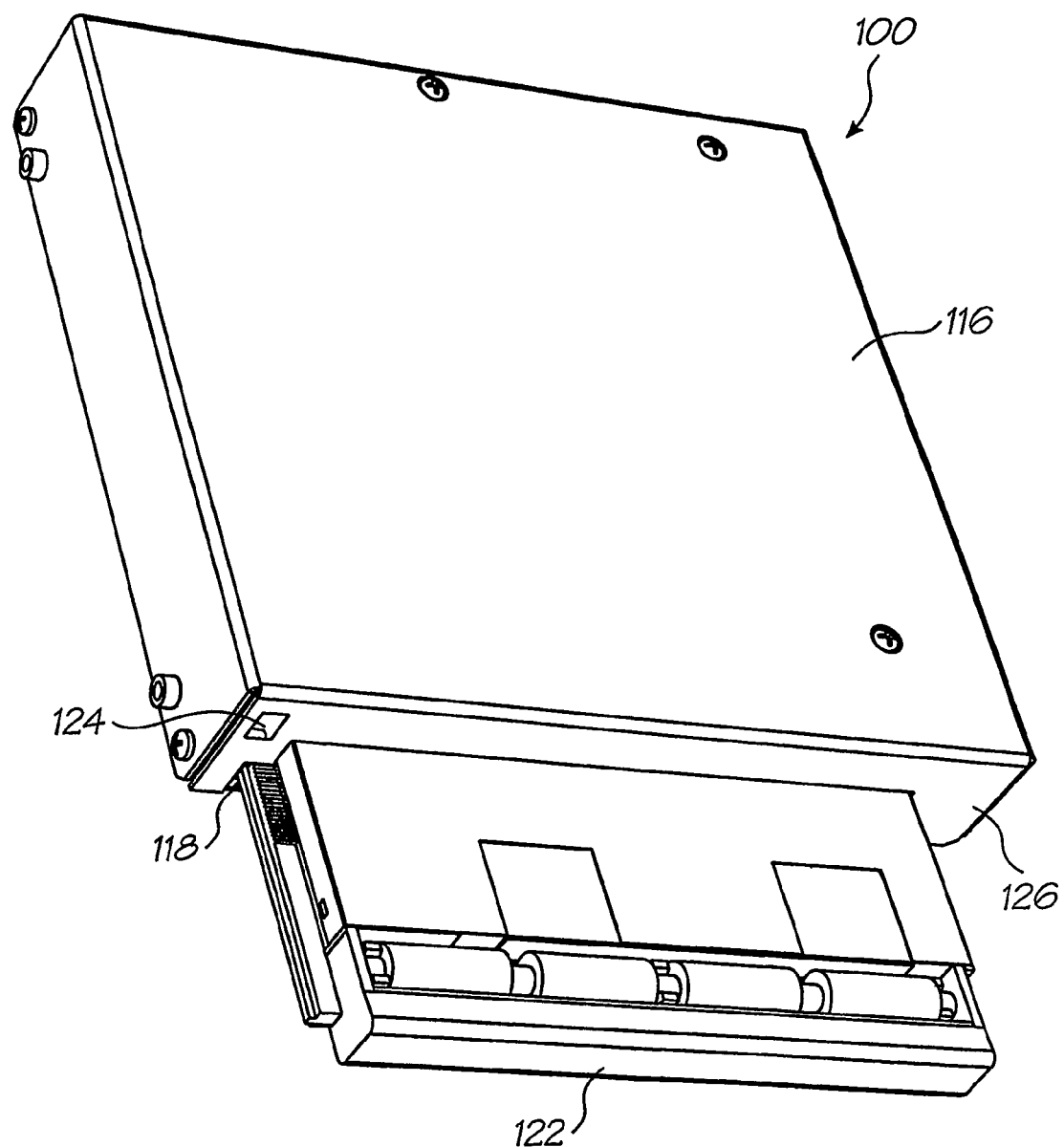
FIG. 2 shows a three dimensional view of a printer for use with the system.

Referring initially to FIG. 1 of the drawings, an in-vehicle information retrieval system is illustrated and is designated generally by the reference numeral 10. The system 10 includes a data generating module in the form of a video output module 12. Video images output from the module 12 are sent to a display facility 18 via a data line 20. The display facility 18 is, conveniently, an LCD panel mounted in a suitable location in the vehicle.

Video data from the module 12 are also output on line 22 to a data capture module or image capture module 14. The image capture module 14 encodes received video data from the module 12 into a compressed image format such as JPEG. Supplementary information such as text representing the time and date at which the image was captured which is required to be overlaid or inserted in some fashion into the printed output hard-copy may also be included in the compressed output from the image capture module 14.

Compressed data are transmitted on line 24 to a printer controller 42 of a printing unit 16 of the system 10. The printer controller 42 controls a printer 100 of the printing unit 16.

Compressed data from the image capture module are also transmitted on line 28 to a wireless communications sub-system 50 for transferring a copy of the captured data to a remote storage database or server for later retrieval or for publication on a website, or the like.

If desired, the system 10 could include a data storage means (not shown), such as a flash memory card, or other suitable storage media with the necessary capacity, for storing the captured image.

The system 10 includes a user terminal 26 which is operated by a user, normally an occupant of the vehicle, to activate the image capture module 14 for capturing an image output by the video output module 12.

Certain of the components of the system 10 are now described in greater detail.

Figure 15:
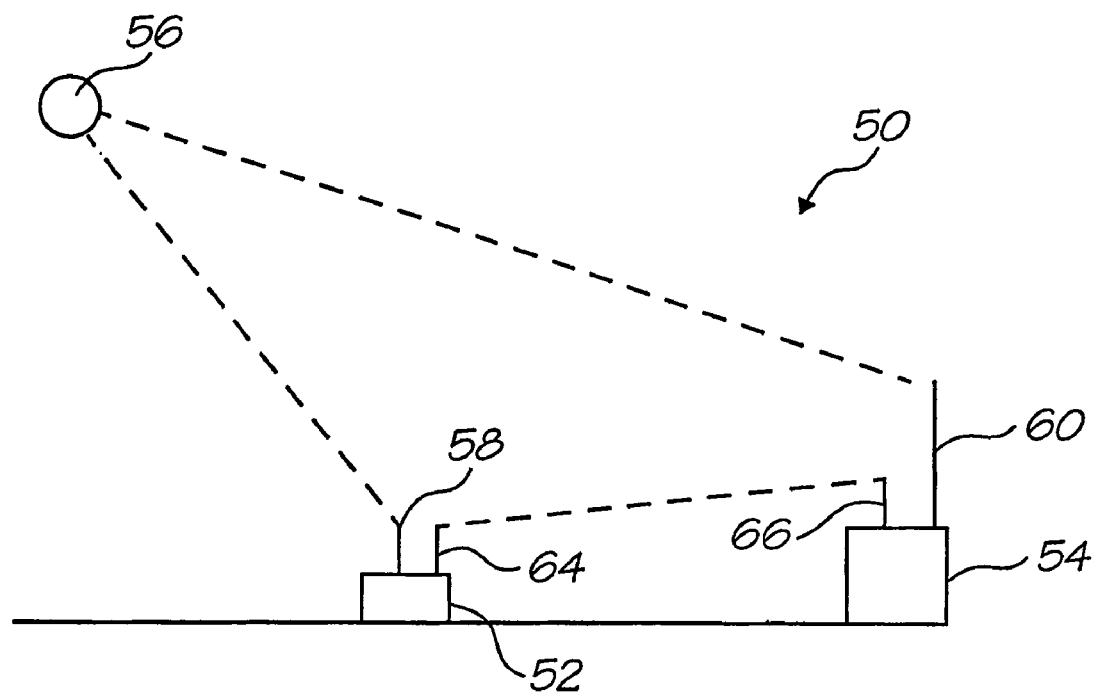
FIG. 15 shows a schematic diagram of a wireless communications sub-system forming part of the system of FIG. 1.

Referring to FIG. 15 of the drawings, various forms of wireless communications sub-system 50 could be employed. One technique is to use a combination of satellite communications and a mobile telephone network.

The sub-system 50 includes a mobile station 52 (being the motor vehicle in this invention) and a fixed station 54. A satellite is designated generally by the reference numeral 56. The satellite 56 communications with the mobile station 52 via a satellite receiver 58. The satellite 56 also communications with the base station 54 via a satellite up link 60.

In addition, the mobile station 52 includes a mobile phone network based transmitter 64 which communicates with a mobile phone network based receiver 66 at the bay station 54.

To enable data to be transmitted from the mobile station 52 to the base station 54, satellite transmission via the satellite 56 is employed as well as the mobile telephone network using the transmitter 64 and the receiver 66.

The printer controller 42 is responsible for handling the hardware specific aspects of the printing process. This enables a number of different types of printing mechanisms or printers 100 to be adopted without changing details of the system further up the chain of print modules.

The printer controller 42 receives a compresses version of each image. The image may be received in its entirety or in a band-wise fashion depending on the size of the image.

In the printer controller 42, the image data are progressively accessed in printer order, decompressed if required and organised into a format suitable for hardware of the printer 100 to enable the hardware of the printer 100 to program its printhead 300. This recognition may include such factors as may be necessary to account for special characteristics of a particular printhead 300 such as up scaling and dithering of the print data and adjustments, if necessary, for the markers and paper being used.

Referring to FIGS. 2 to 7 of the drawings, the printer 100 is described in greater detail.

The printer 100 includes a chassis 112 (FIG. 3) which is covered by a top cover 116 that has an access opening 118 closed off by a flap 120. The flap 120 is spring biased so that, when a cartridge 122 has been removed from the printer 100, the flap is urged upwards to close off the access opening 118.

The device which sends commands to the printer 100 can either be hard wired to the printer 100, for example, via a wiring loom of the motor vehicle or, instead, the device may send commands to the printer 100 in a wireless manner. For this purpose, the printer 100 includes a port 124 able to detect wireless communications, such as infra-red communications.

Figure 3:
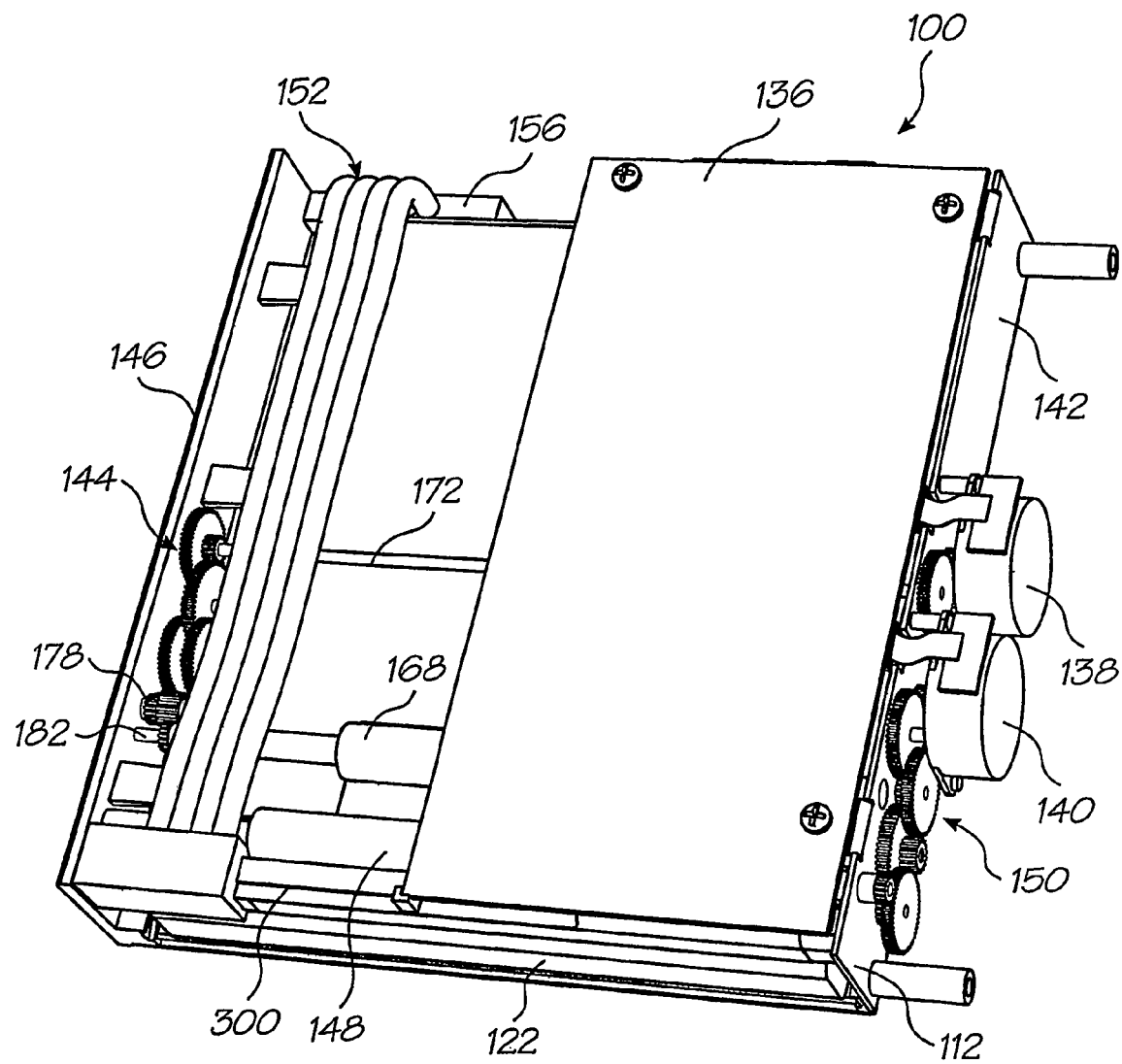
FIG. 3 shows a three dimensional view of the printer with a cover removed.

The printer 100 incorporates a printhead 300 (FIG. 3). The printhead 300 is a pagewidth inkjet printhead. More particularly, the printhead 300 is a four color printhead, or three color plus infra red ink, printhead which prints photo quality prints on print media stored in the cartridge 122. The printhead 300 comprises an array of nozzles to provide printing at 1600 dpi. The nozzles of the printhead 300 are manufactured using the applicant's Memjet technology. The printhead is described in greater detail below.

The printhead 300 receives commands from a printed circuit board (PCB) 136 secured to the chassis 112.

A pair of drive motors 138 and 140 is mounted on a sidewall 142 of the chassis 112. The drive motor 138, which is in the form of a stepper motor, drives a first drive arrangement in the form of a first gear train 144. The first gear train 144 is mounted on a side molding 146 of the chassis 112.

The drive motor 140, which is also in the form of a stepper motor, drives a drive roller 148 via a second drive arrangement in the form of a second gear train 150.

The printhead 300 receives ink from ink hoses 152 which communicate with an ink supply reservoir 154 (FIG. 7) of the cartridge 122 via an ink supply manifold 156, as will be described in greater detail below.

Figure 4:
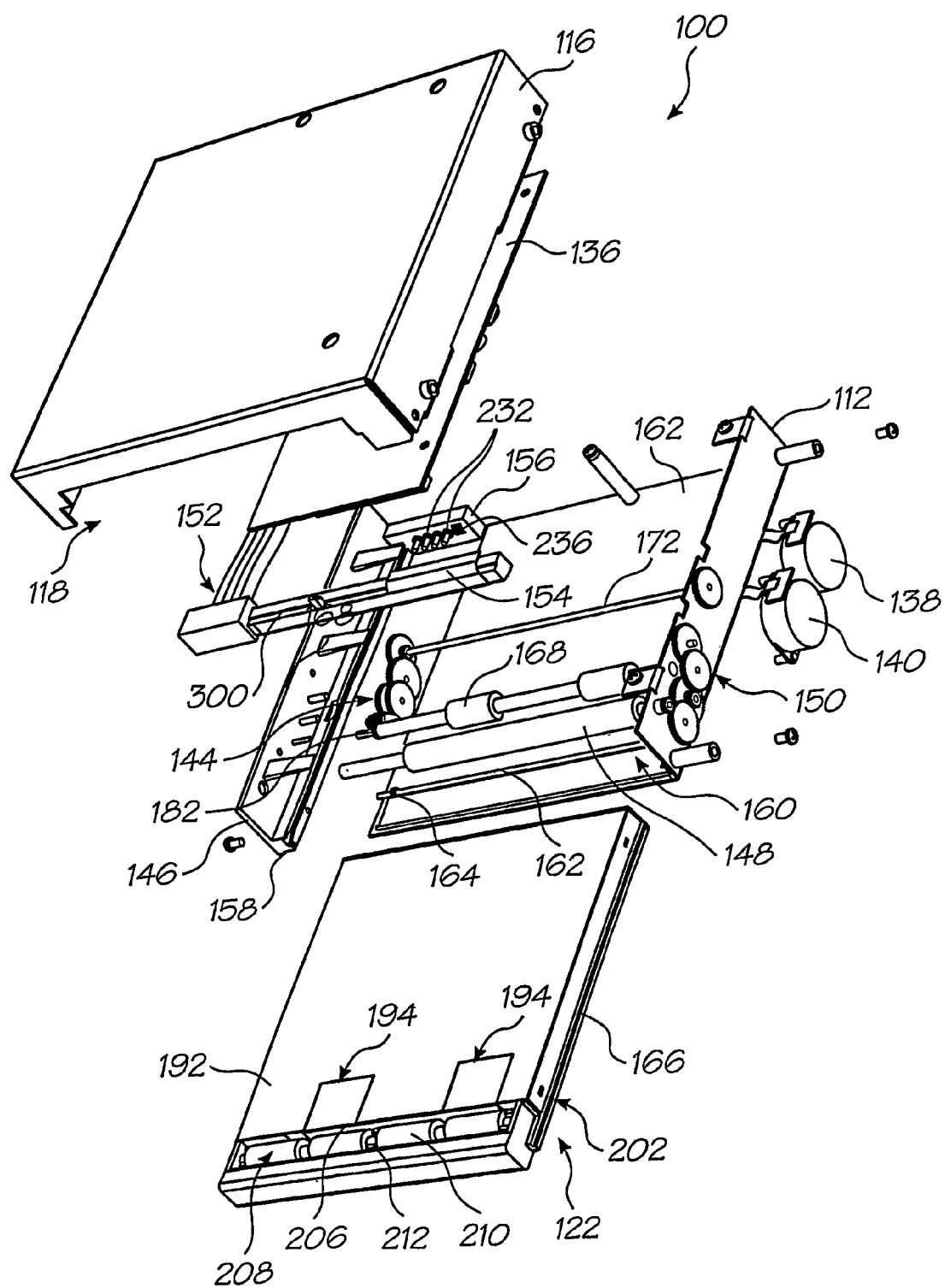
FIG. 4 shows a three dimensional, exploded view of the printer.
Figure 5:
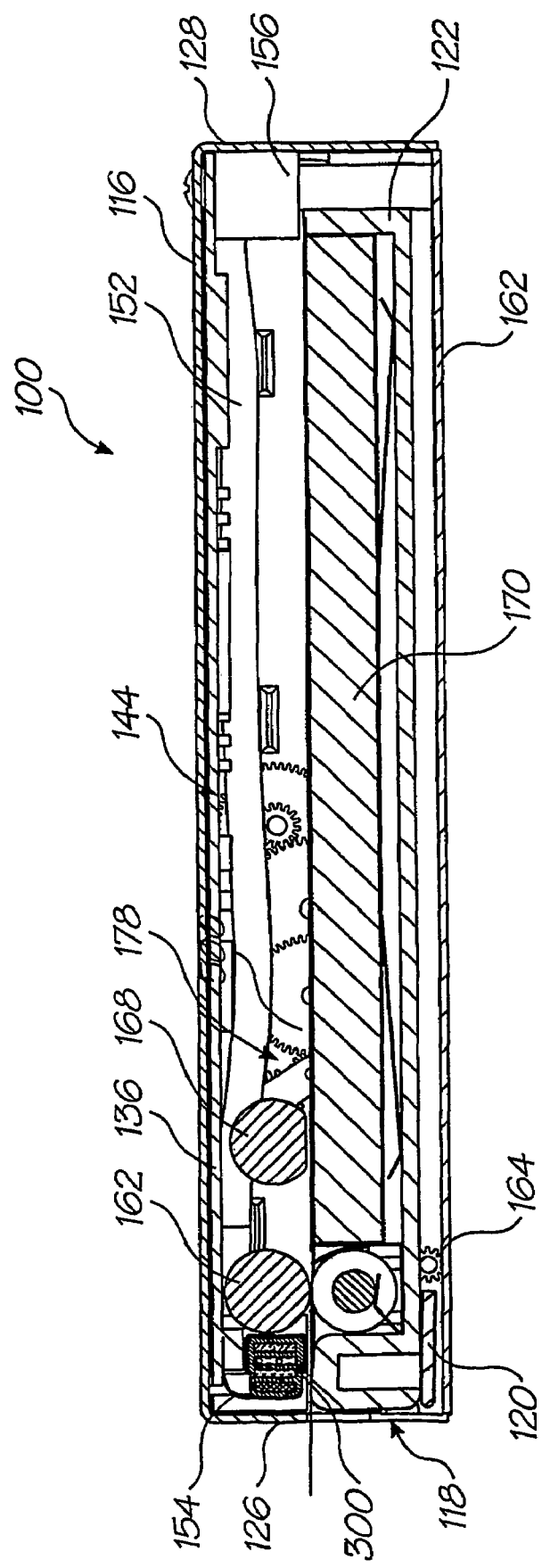
FIG. 5 shows a sectional side view of the printer.

Referring to FIG. 4 of the drawings, an exploded view of the printer 100 is illustrated. It is to be noted that the printhead 300 communicates with the PCB 136 via a TAB film 154.

A slot 158 is defined in the side molding 146. The slot 158 receives a corresponding formation of the cartridge 122 in it. Further, a roller set 160 is mounted on a base 162 of the printer 100. The roller set 160 comprises a rotatable axle 162. A cog 164 is mounted proximate each end of the axle 162. Each cog 164 engages a longitudinally extending rack 200, 202, one on each side of the cartridge 122, for inhibiting skewing of the cartridge 122 as it is inserted into, or withdrawn from, the printer 100.

The first gear train 144 engages a pickup roller 168 of the printer 100. The pickup roller 168 picks up print media in the form of a sheet of paper from a stack 170 of paper (FIG. 5) in the cartridge 122 for feeding to the printhead 300 of the printer 100 when printing is to be effected.

As shown in greater detail in FIG. 4 of the drawings, the first gear train 144 is powered by the stepper motor 138 via an axle 172 extending across the printer 100 to convey power from the stepper motor 138 to the first gear train 144. A gear 174 is mounted against the molding 146 at one end of the axle 172. The gear 174 drives a reduction gear set 176. Further, the reduction gear set 176 communicates with a reversing mechanism 178. Accordingly, the gear train 144 performs two functions. When the reversing mechanism 178 is not selected, the gear train 144 engages an upper rack 180 on the cartridge 122 for feeding the cartridge 122 into the printer 100 or ejecting the cartridge 122 from the printer 100. Instead, when the reversing mechanism has been selected, it engages the pick up roller 168 or, more particularly, a gear 182 mounted at an end of the pick up roller 168. The gear train 144 then serves to feed the paper to the drive roller 148 for conveying to the printhead 300.

Figure 6:
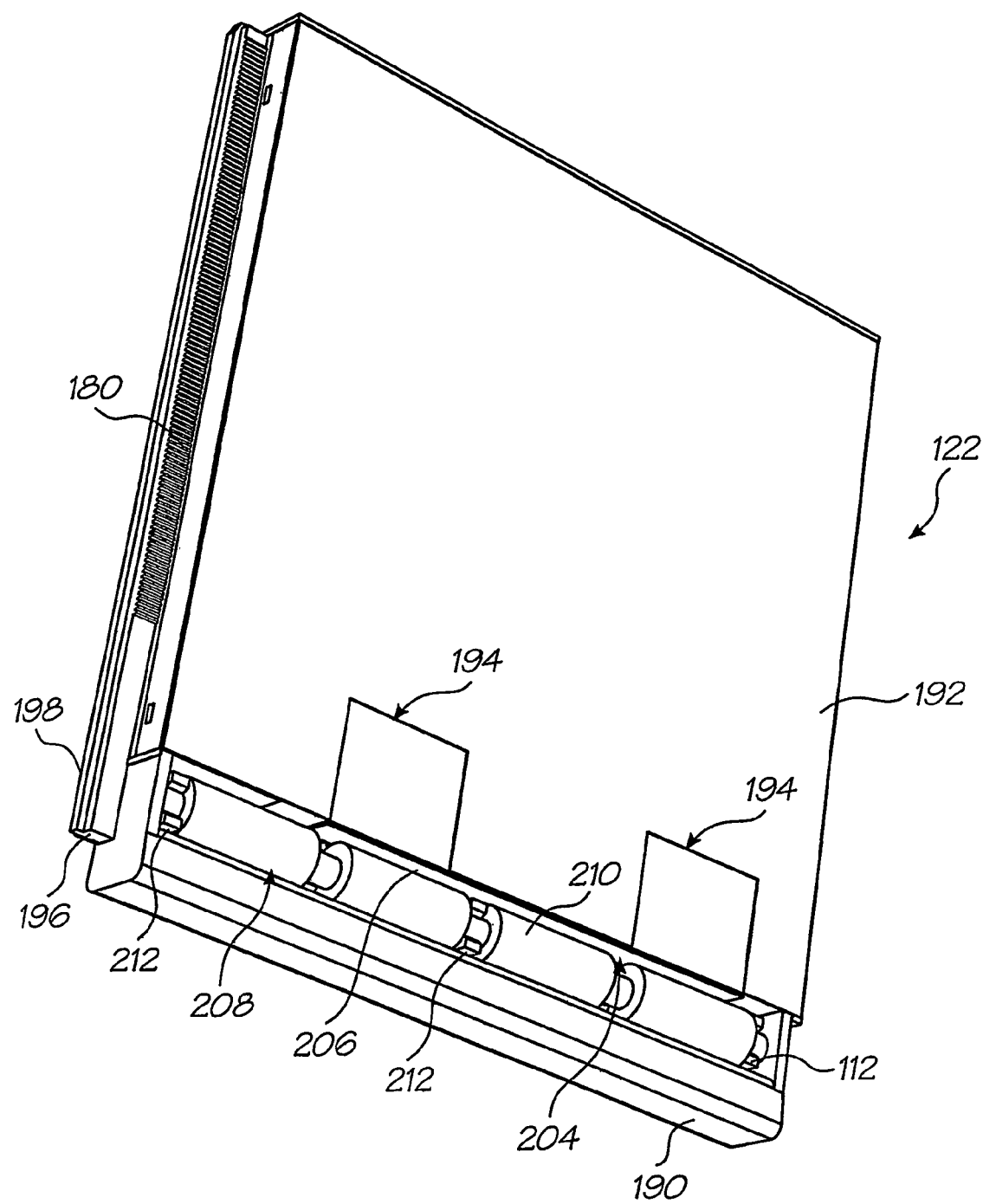
FIG. 6 shows a three dimensional view of a cartridge for the printer.
Figure 7:
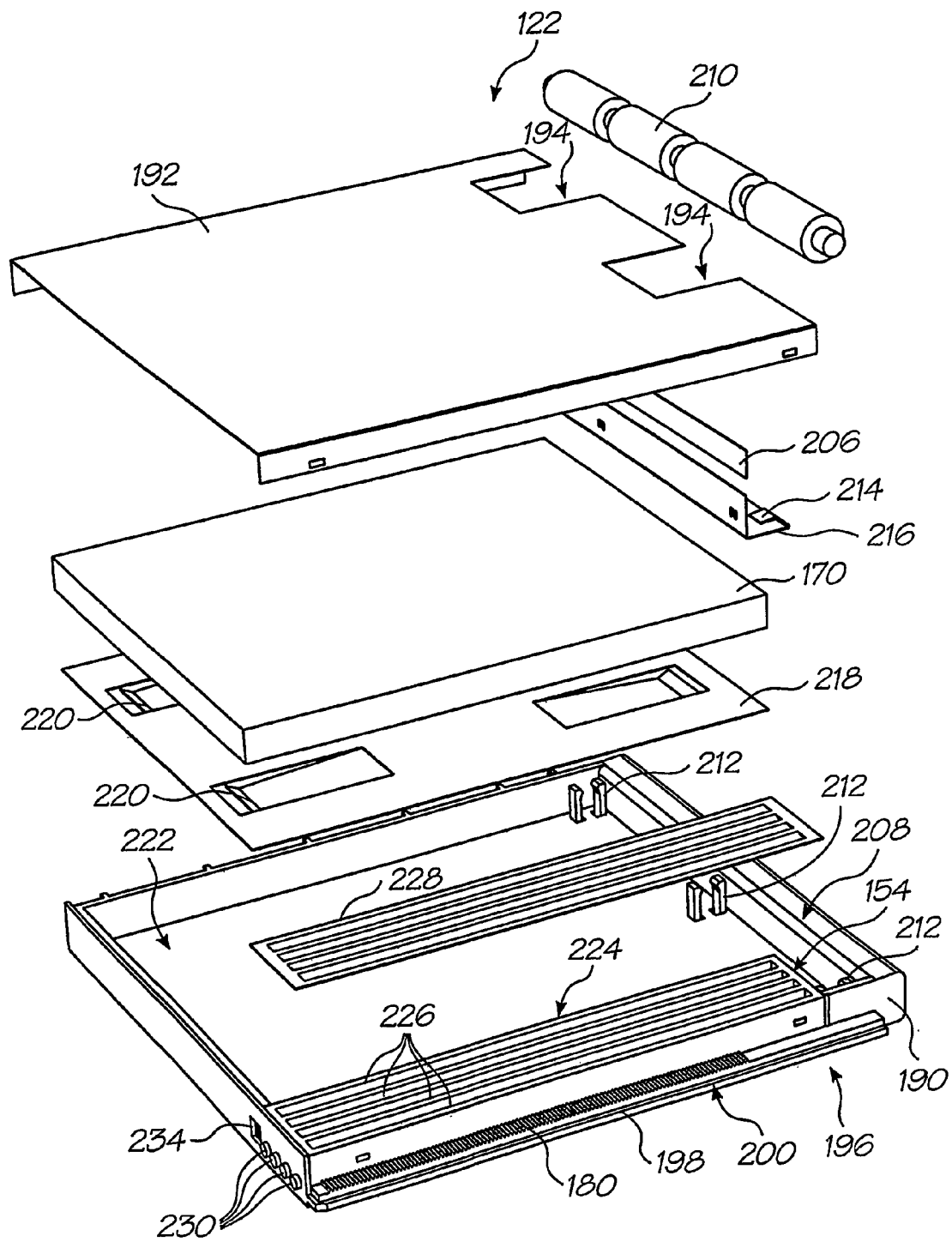
FIG. 7 shows a three dimensional, exploded view of the cartridge.

Referring now to FIGS. 6 and 7 of the drawings, the cartridge 122 is described in greater detail.

The cartridge 122 comprises a base molding 190. The base molding 190 is closed off by a metal cover 192. The cover 192 has a pair of transversely spaced openings 194 defined in a front edge thereof. These openings 194 permit the pick up roller 168 of the printer 100 to engage a topmost sheet of the stack 170 of paper within the cartridge 122.

A toothed rack 196 is provided on one side of the cartridge 122. The toothed rack 196 defines the upper rack 180 which is engaged by a gear of the first gear train 144 for insertion of the cartridge 122 into, or its ejection from, the printer 100. A rib 198 extends longitudinally along the side of the toothed rack 196. The rib 198 is received in the slot 158 in the side molding 146 of the printer 100. A lower surface of the toothed rack 196 also has one of the longitudinally extending racks 200 (FIG. 7) for engagement with one of the cogs 164. An opposed side of the base molding 190 of the cartridge 122 carries the other of the longitudinally extending racks 202 which engages the other cog 164 for inhibiting skewing of the cartridge 122 when it is inserted into, or ejected from, the printer 100.

A feed slot 204 is defined at a front edge of the metal cover through which a sheet of paper to be printed is passed in use. The feed slot 204 is partially defined by a plastics strip 206 which inhibits more than one sheet of paper being fed to the printhead 300 at any one time.

A transversely extending trough 208 is defined outwardly of the strip 206. The trough 208 accommodates a sprung roller 210 therein. The roller 210 is supported in the trough 208 via a plurality of clips 212.

The roller 210 is biased upwardly relative to a base of the trough 208 via a plurality of leaf springs 214. The leaf springs 214 are formed integrally with an L-shaped metal bracket 216 which partially forms the trough 208. The roller 210 is a snap-fit in the clips 212.

A platen 218 is accommodated in the base molding 190. The platen 218 is spring biased via a plurality of leaf springs 220 which engage a floor 222 of the base molding 190 for urging the stack 170 of paper against the cover 192.

The ink supply reservoir 154 includes an ink supply molding 224 formed integrally with the base molding 190. The ink supply molding 224 defines a plurality of ink supply channels 226. Each ink supply channel 226 contains a particular color of ink. In this context, the term "color" is to be understood as including inks which are invisible in the visible spectrum such as, for example, infra red inks.

The channels 226 are closed off by a flexible bladder-like membrane 228 which is heat-sealed to the molding 224. It will be appreciated that, as ink is withdrawn from each channel 226, the associated membrane 228 collapses into the channel 226 thereby inhibiting the ingress of air into that channel 226.

Each channel 226 communicates with an ink outlet 230. Each ink outlet 230 is in the form of a rupturable seal.

As shown in greater detail in FIG. 4 of the drawings, the ink supply manifold 156 of the printer 100 includes pins 232. These pins 232 communicate with the ink supply hoses 152. When the cartridge 122 is inserted into the printer 100, and the cartridge 122 is driven home by the gear train 144, the pins 232 pierce the seals 230 to place the hoses 152 in communication with their associated ink supply channels 226.

The cartridge 122 includes a quality assurance chip 234. This chip 234 ensures correct communications between the cartridge 122 and the printer 100 and that the cartridge 122 is of the required quality. The chip 234 communicates with the printer 100 via chip contacts 236 mounted on the ink supply manifold 156 of the printer 100. Thus, when the cartridge 122 is driven home by the gear train 144, the chip 234 engages the contacts 236 for enabling communications to be established between the chip 234 and the circuit board 136 of the printer 100.

The cartridge 122 is a disposable unit so that, once its ink supply and paper supply have been depleted, the cartridge is disposed of. Instead, the cartridge 122 may be re-useable. In the latter case, once the supply of ink and paper in the cartridge 122 have been depleted and the cartridge 122 is ejected from the printer 100, the used, empty cartridge 122 can be taken by a user to a supplier for a refund. It is to be noted that the cartridge 122 is automatically ejected from the printer 100 once its supply of paper and/or ink has been depleted.

Referring to FIGS. 8 to 14 of the drawings, the printhead 300 is described in greater detail. The printhead 300 comprises an array, which will be described in greater detail below, of nozzle assemblies.

Figure 8:
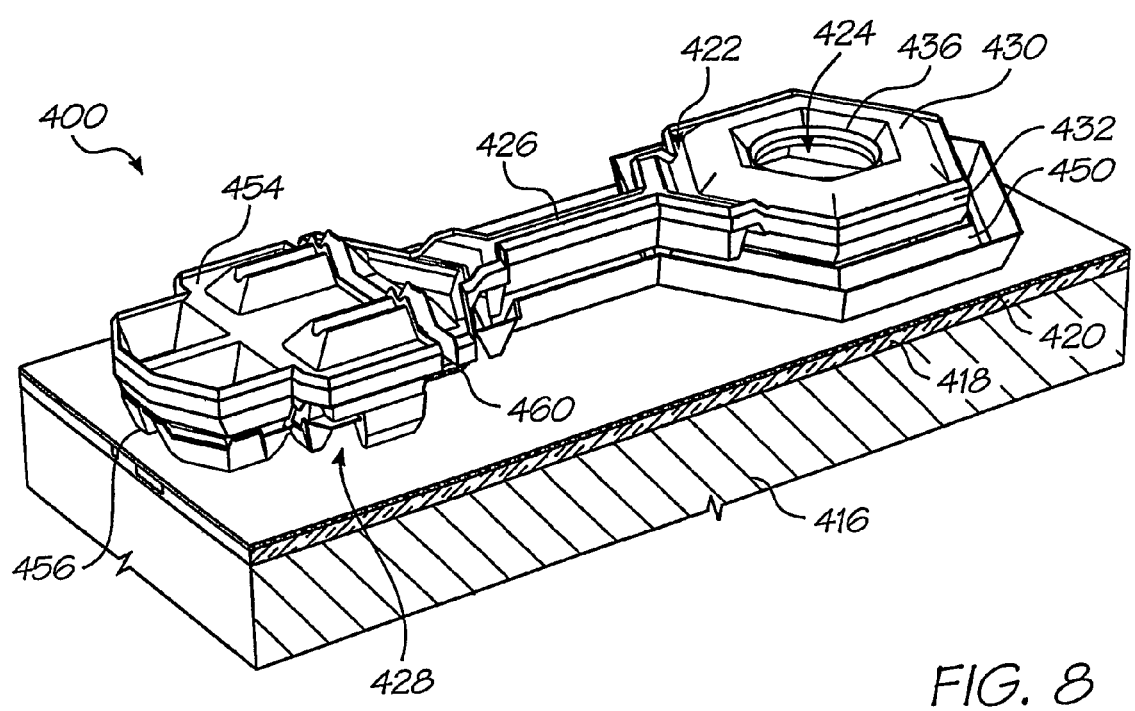
FIG. 8 shows a three dimensional, schematic view of a nozzle assembly for an ink jet printhead for the printer.

Referring to FIG. 8 of the drawings, a nozzle assembly is illustrated and is designated generally by the reference numeral 400.

The assembly 400 includes a silicon substrate or wafer 416 on which a dielectric layer 418 is deposited. A CMOS passivation layer 420 is deposited on the dielectric layer 418.

Each nozzle assembly 400 includes a nozzle 422 defining a nozzle opening 424, a connecting member in the form of a lever arm 426 and an actuator 428. The lever arm 426 connects the actuator 428 to the nozzle 422.

Figure 9:
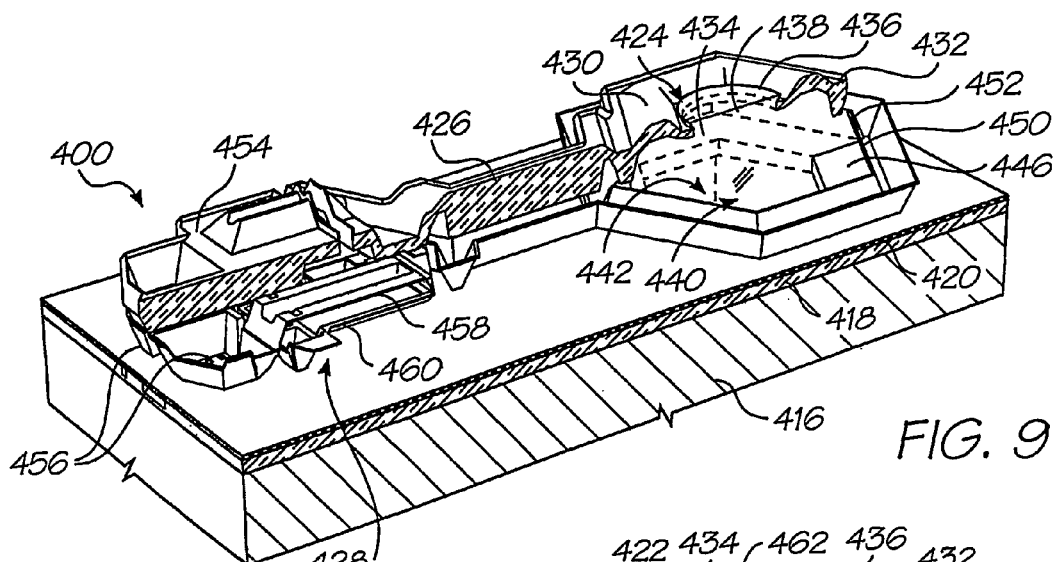
FIGS. 9 to 11 show a three dimensional, schematic illustration of an operation of the nozzle assembly of FIG. 8.
Figure 10:
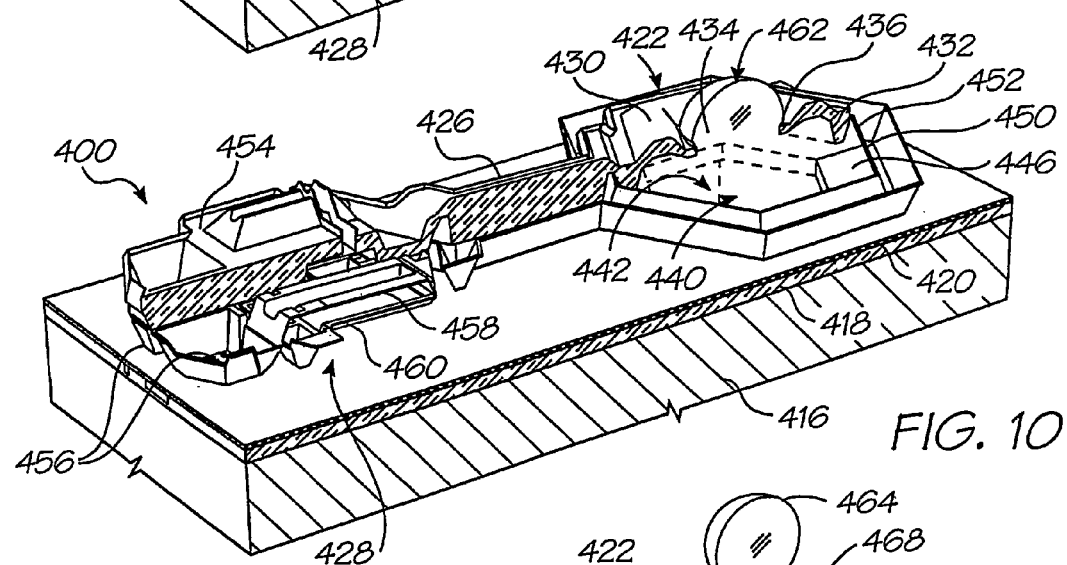
Figure 11:
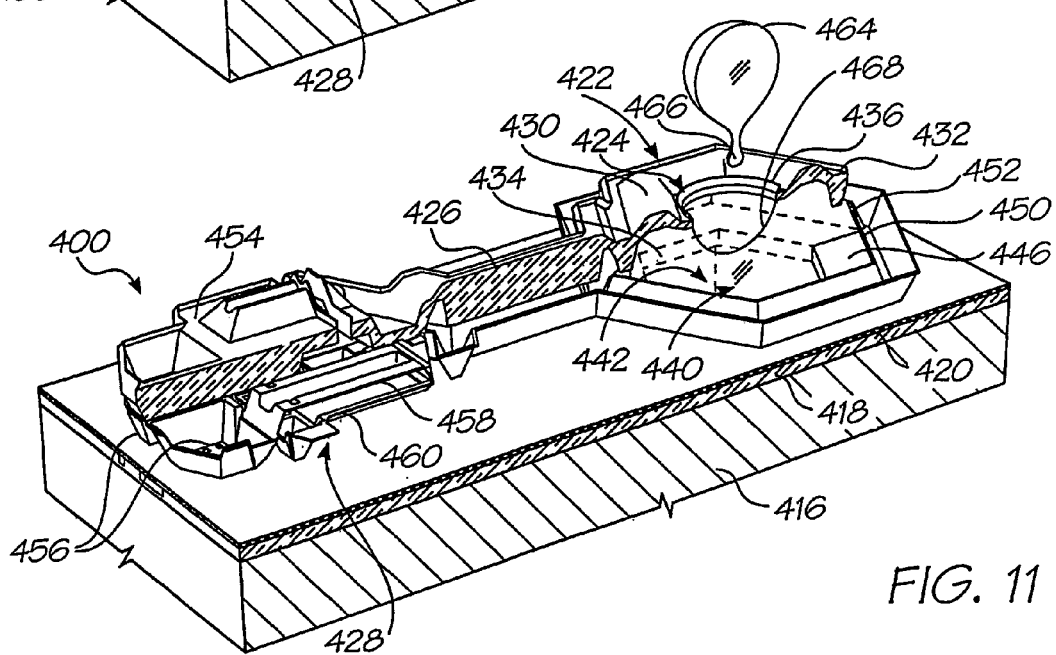

As shown in greater detail in FIGS. 9 to 11 of the drawings, the nozzle 422 comprises a crown portion 430 with a skirt portion 432 depending from the crown portion 430. The skirt portion 432 forms part of a peripheral wall of a nozzle chamber 434. The nozzle opening 424 is in fluid communication with the nozzle chamber 434. It is to be noted that the nozzle opening 424 is surrounded by a raised rim 436 which "pins" a meniscus 438 (FIG. 9) of a body of ink 440 in the nozzle chamber 434.

An ink inlet aperture 442 (shown most clearly in FIG. 13 of the drawings) is defined in a floor 446 of the nozzle chamber 434. The aperture 442 is in fluid communication with an ink inlet channel 448 defined through the substrate 416.

A wall portion 450 bounds the aperture 442 and extends upwardly from the floor portion 446. The skirt portion 432, as indicated above, of the nozzle 422 defines a first part of a peripheral wall of the nozzle chamber 434 and the wall portion 450 defines a second part of the peripheral wall of the nozzle chamber 434.

The wall 450 has an inwardly directed lip 452 at its free end which serves as a fluidic seal which inhibits the escape of ink when the nozzle 422 is displaced, as will be described in greater detail below. It will be appreciated that, due to the viscosity of the ink 440 and the small dimensions of the spacing between the lip 452 and the skirt portion 432, the inwardly directed lip 452 and surface tension function as a seal for inhibiting the escape of ink from the nozzle chamber 434.

The actuator 428 is a thermal bend actuator and is connected to an anchor 454 extending upwardly from the substrate 416 or, more particularly, from the CMOS passivation layer 420. The anchor 454 is mounted on conductive pads 456 which form an electrical connection with the actuator 428.

The actuator 428 comprises a pair of first, active beams 458 arranged above a pair of second, passive beams 460. In a preferred embodiment, both pairs of beams 458 and 460 are of, or include, a conductive ceramic material such as titanium nitride (TiN).

Both pairs of beams 458 and 460 have their first ends anchored to the anchor 454 and their opposed ends connected to the arm 426. When a current is caused to flow through the active beams 458 thermal expansion of the beams 458 result As the passive beams 460, through which there is no current flow, do not expand at the same rate, a bending moment is created causing the arm 426 and, hence, the nozzle 422 to be displaced downwardly towards the substrate 416 as shown in FIG. 10 of the drawings. This causes ejection of ink through the nozzle opening 424 as shown at 462 in FIG. 10 of the drawings. When the source of heat is removed from the active beams 458, i.e. by stopping current flow, the nozzle 422 returns to its quiescent position as shown in FIG. 11 of the drawings. When the nozzle 422 returns to its quiescent position, an ink droplet 464 is formed as a result of the brealing of an ink droplet neck as illustrated at 466 in FIG. 11 of the drawings. The ink droplet 464 then travels on to the print media such as a sheet of paper. As a result of the formation of the ink droplet 464, a "negative" meniscus is formed as shown at 468 in FIG. 11 of the drawings. This "negative" meniscus 468 results in an inflow of ink 440 into the nozzle chamber 434 such that a new meniscus 438 is formed in readiness for the next ink drop ejection from the nozzle assembly 400.

Figure 12:
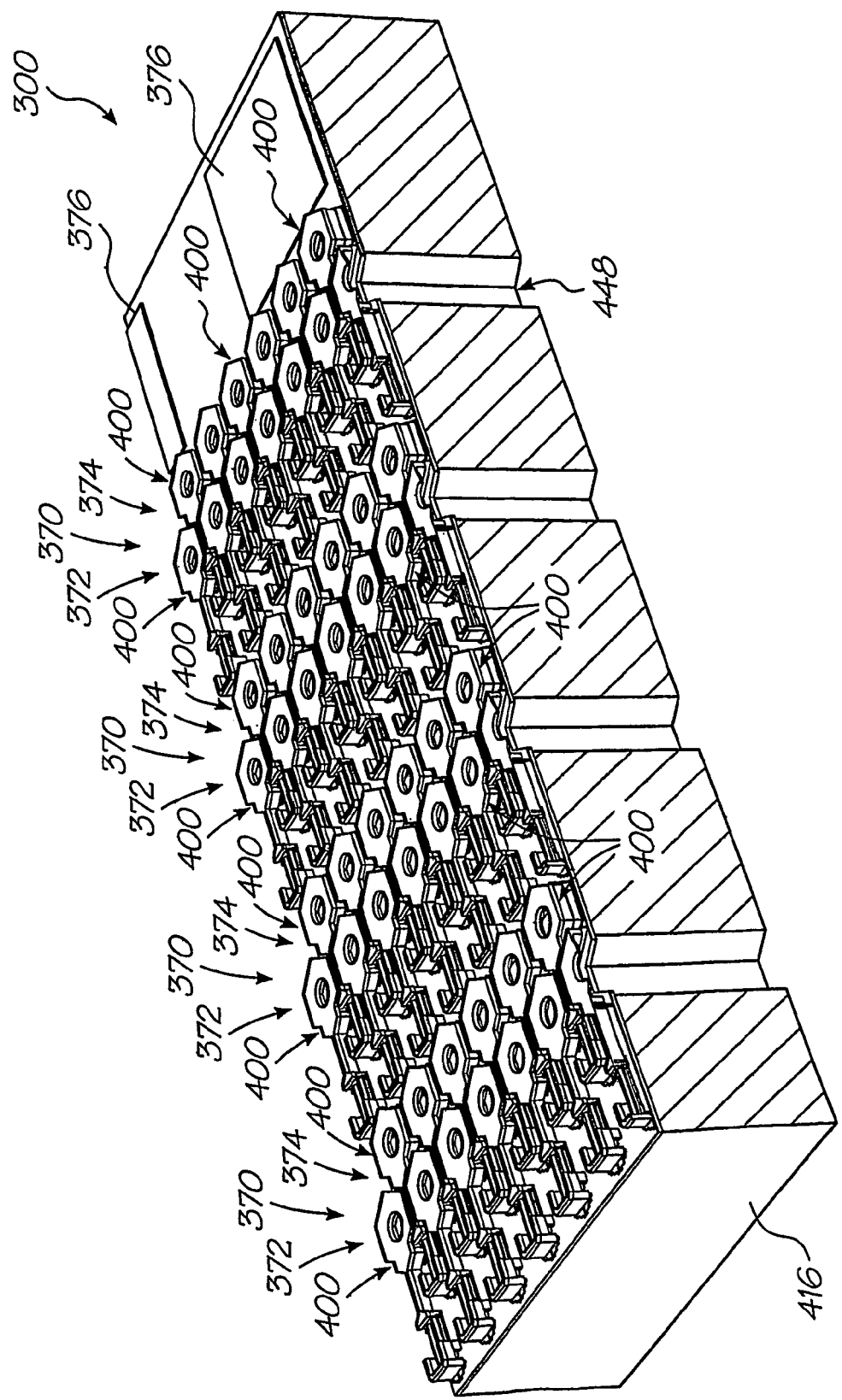
FIG. 12 shows a three dimensional view of a nozzle array constituting the printhead.
Figure 13:
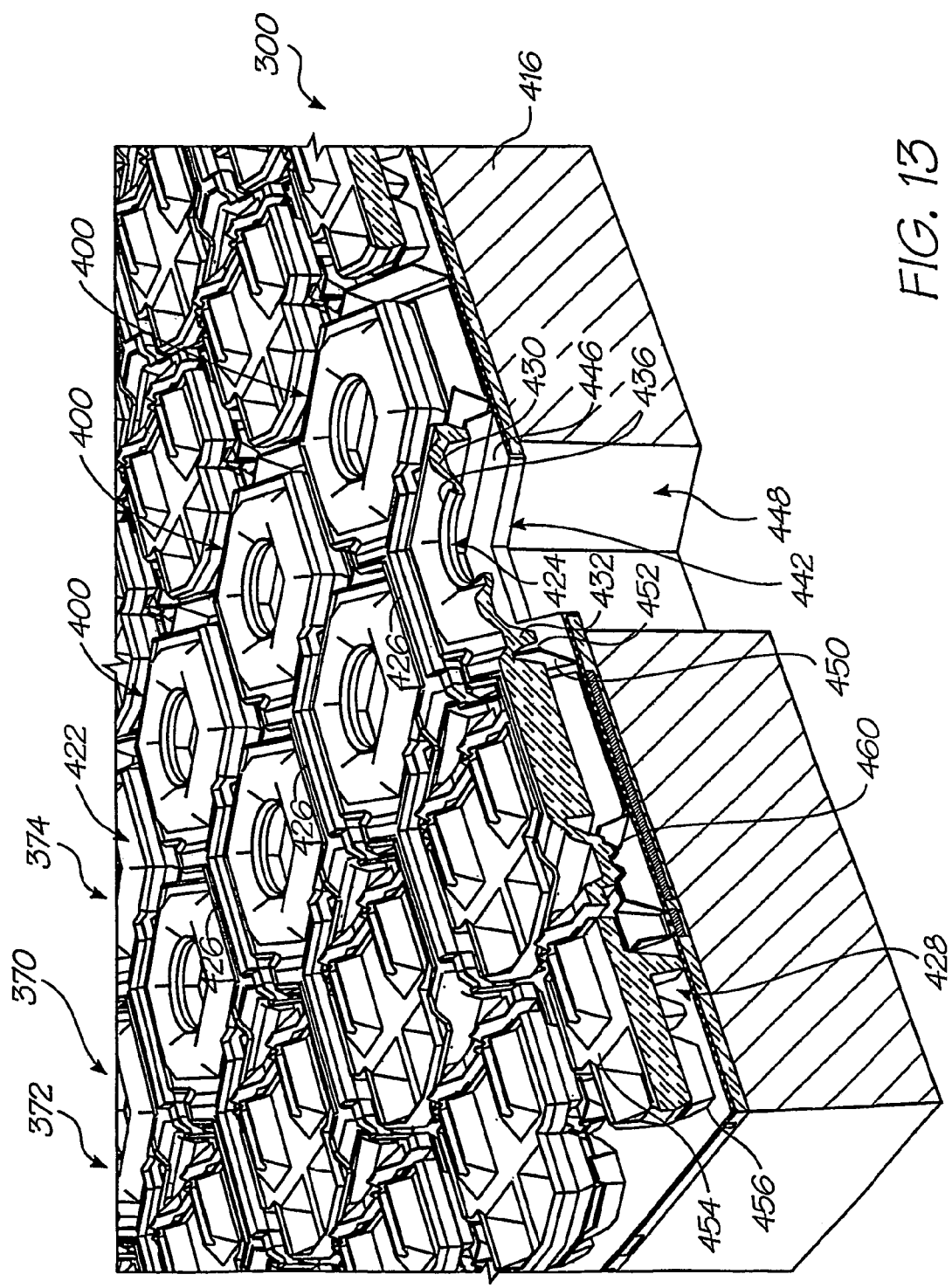
FIG. 13 shows, on an enlarged scale, part of the array of FIG. 12.
Figure 14:
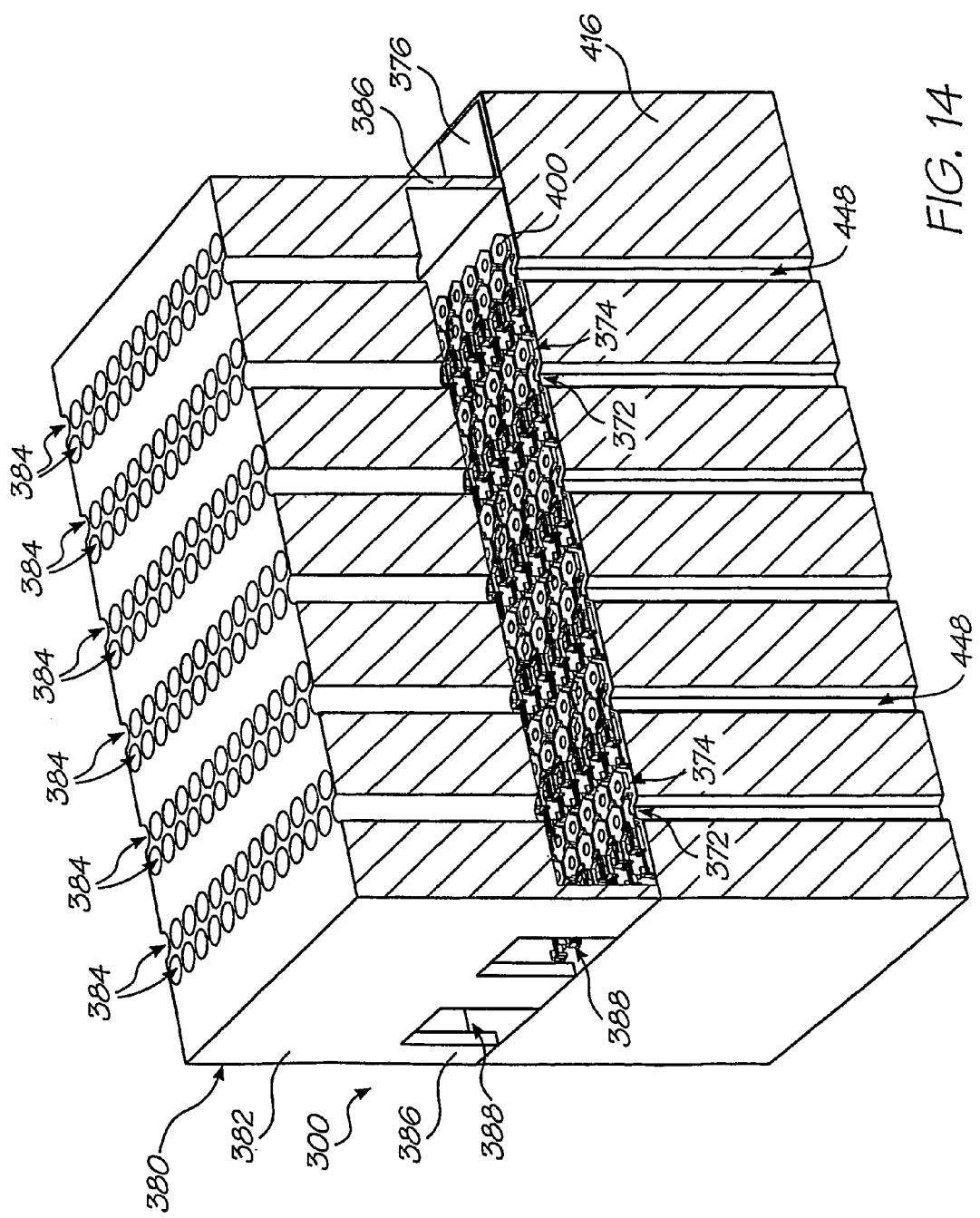
FIG. 14 shows a three dimensional view of the printhead including a nozzle guard.

Referring now to FIGS. 12 to 14 of the drawings, a part of the printhead 300 is described in greater detail. The printhead 300 is a four color printhead. Accordingly, the printhead 300 includes four groups 370 of nozzle assemblies, one for each color. Each group 370 has its nozzle assemblies 400 arranged in two rows 372 and 374. One of the groups 370 is shown in greater detail in FIG. 13 of the drawings.

To facilitate close packing of the nozzle assemblies 400 in the rows 372 and 374, the nozzle assemblies 400 in the row 374 are offset or staggered with respect to the nozzle assemblies 400 in the row 372. Also, the nozzle assemblies 400 in the row 372 are spaced apart sufficiently far from each other to enable the lever arms 426 of the nozzle assemblies 400 in the row 374 to pass between adjacent nozzles 422 of the assemblies 400 in the row 372. It is to be noted that each nozzle assembly 400 is substantially dumbbell shaped so that the nozzles 422 in the row 372 nest between the nozzles 422 and the actuators 428 of adjacent nozzle assemblies 400 in the row 374.

Further, to facilitate close packing of the nozzles 422 in the rows 372 and 374, each nozzle 422 is substantially hexagonally shaped.

The substrate 416 has bond pads 376 arranged thereon which provide the electrical connections, via the pads 456, to the actuators 428 of the nozzle assemblies 400. These electrical connections are formed via the CMOS layer (not shown).

A nozzle guard 380 is mounted on the substrate 416 of the printhead 300. The nozzle guard 380 includes a body member 382 having a plurality of passages 384 defined therethrough. The passages 384 are in register with the nozzle openings 424 of the nozzle assemblies 400 of the printhead 300 such that, when ink is ejected from any one of the nozzle openings 424, the ink passes through the associated passage 384 before striking the print media.

The body member 382 is mounted in spaced relationship relative to the nozzle assemblies 400 by limbs or struts 386. One of the struts 836 has air inlet openings 388 defined therein.

When the printhead 300 is in operation, air is charged through the inlet openings 388 to be forced through the passages 384 together with ink travelling through the passages 384. The purpose of the air is to maintain the passages 384 clear of foreign particles. A danger exists that these foreign particles, such as dust particles, could fall onto the nozzle assemblies 400 adversely affecting their operation. With the provision of the air inlet openings 388 in the nozzle guard 380 this problem is, to a large extent, obviated.

Figure 16:
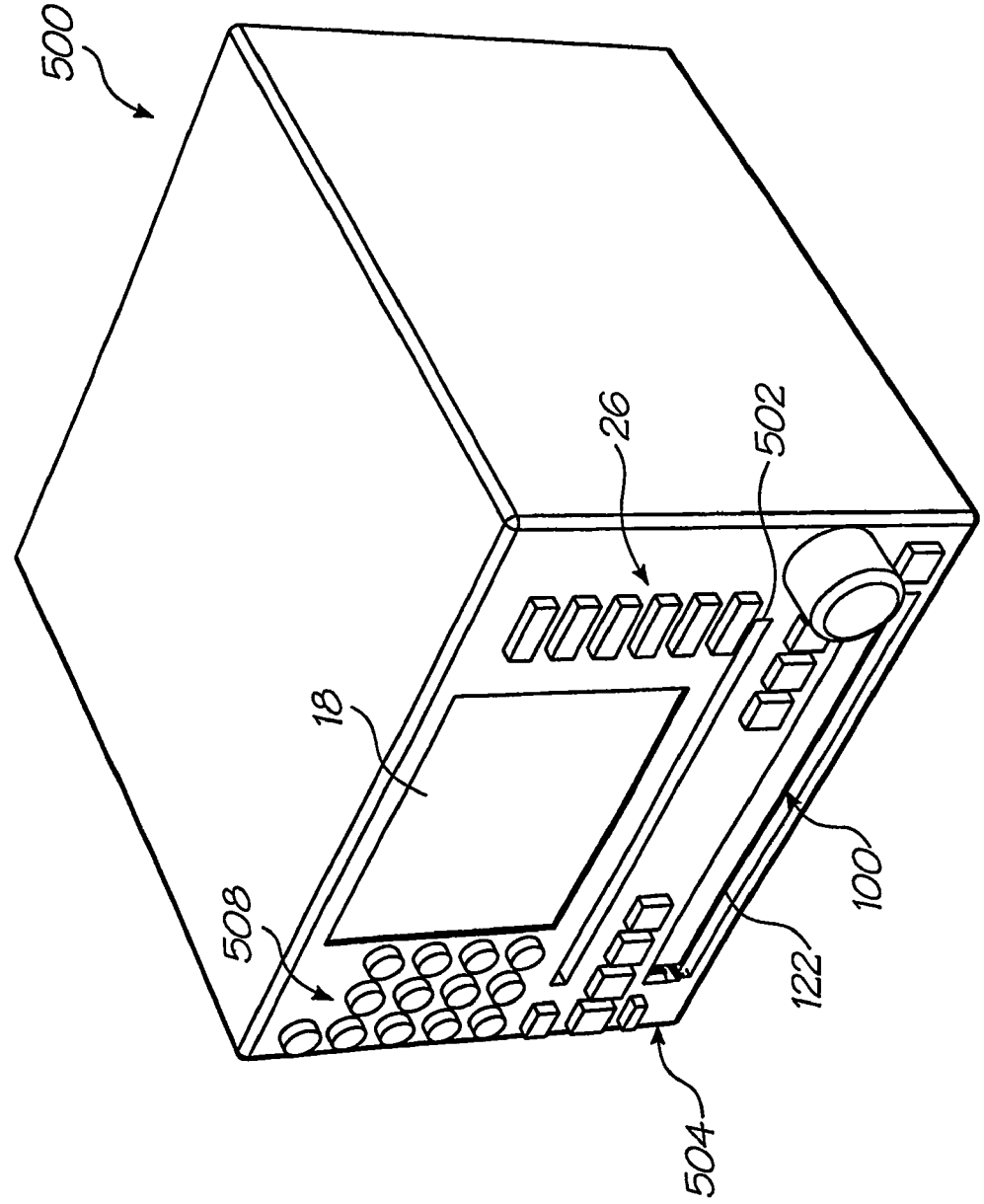
FIG. 16 shows a three dimensional view of an implementation of the system.

In another embodiment of the invention, the printer 100 is built into and forms part of an in-car entertainment unit 500, as shown in FIG. 16 of the drawings.

The ICE unit 500, in addition to a CD player 502 and a radio having controls 504, includes a full color LCD 506. The unit 500 functions as a satellite navigation unit and may also be used for receiving television signals. The unit 500 incorporates a printer 100 of the type described above. The unit 500 includes a bank of control buttons 508. This bank of buttons 508 constitutes GPS controls and is used for satellite navigation purposes. In addition, the unit includes the user terminal 26 which is provided for controlling the printer 100 and the content printed by the printer 100.

In use, when it is desired to capture content of the video output module 12, the user terminal 26 is activated by the user. Activation of the user terminal, in turn, causes activation of the image capture module 14 so that data which are output by the video output module are captured via data line 22. Image compression techniques are then used in the image capture module 14 so that compressed image data are output on data line 24 to the printer controller 42. The printer controller 42 manipulates the compressed image data into a suitable format to be printed by the printer 100 so that a hard copy of the captured image is printed. As indicated above, supplementary information may be overlayed or inserted in some other fashion into the printed image.

If desired, the captured image can also be output on data line 28 to the wireless communications sub-system 50 for onward transmission to a remote server.

One class of application where the present system 10 is useful is in the capture of video game screens. For example, a player of the video game may wish to have a hard copy of that player's highest score in a particular game. By means of the system 10 such an image can be captured and printed.

Thus, if one or more players are playing a video game in a vehicle making use of the built-in display facility 18 and one of the players were to achieve a highest score or a score that was of significance based on previous game play then by actuating the user terminal 26 a printed record of that achievement can be produced for future reference.

Another application in which the present system is of use is in the capture of frames from television broadcasts such as a weather broadcast or to obtain hard copies of information broadcast in a television program, for example, the location of a restaurant.

Thus, the wireless communications sub-system 50 can be used to receive broadcast signals which are displayed via the video output module 12 on the display facility 18.

Often, these television broadcasts contain information that a viewer is interested in saving for later reference. For example, whilst watching a weather program, the amount of information presented in a single display may be too great for a user to comprehend at once.

The same is also true for some programs, for example, that provide restaurant reviews, or the like. This problem is compounded if a viewer happens to be in a vehicle where there is a likelihood of other distractions being present.

By means of the system 10, should a viewer see a television program which the viewer wishes to save for later reference, by appropriately actuating the user terminal 26, images relating to the program can be saved and printed.

Accordingly, it is an advantage of the invention, that a system 10 is provided which facilitates printing of images displayed on a display facility in a motor vehicle. This obviates the need for either trying to memorise content of images displayed on such a display facility or attempt to write down details regarding such images which necessitates finding paper and pen to record the information. It will be appreciated that, even if it is not the driver of the vehicle that is attempting to find such paper and pen, this can be distracting to the driver which can be dangerous.

It is another advantage of the invention that a system 10 is provided that enables occupants of the vehicle to record images that they have seen and that they desire to print out for later reference.

Although the invention has been described with reference to a number of specific embodiments, it will be appreciated by those skilled in the art that the invention may be embodied in many other forms. It will further be understood that any reference herein to known prior art does not, unless the contrary indication appears, constitute an admission that such prior art is commonly known by those skilled in the art to which the invention relates.

The invention claimed is:

1. An in-vehicle information retrieval system incorporated in an entertainment unit of the vehicle, the in-vehicle entertainment unit having a display means and including:
    a data generating module of the system for generating data within the vehicle, the data generating module including image data for displaying on the display means;
    a data capture module of the system, in communication with the data generating module, the data capture module including an image capture module for capturing image data from the data generating module and means for applying supplemental information regarding the captured image data onto the image data;
    the data capture module including a user terminal associated with the image capture module, the user terminal being operable by a user to cause image data to be captured on demand by the image capture module; and
    a printing module of the system connected to the data capture module, the printing module comprising a pagewidth printhead for printing image data captured by the image capture module together with the supplemental information applied by the data capture module.

2. The system of claim 1 in which the image data include video data.

3. The system of claim 2 in which the video data are displayed on the display means.

4. The system of claim 1 in which the image capture module encodes data from the data generating module into a suitable format for printing.

5. The system of claim 4 in which the printing module includes a printer controller in communication with the image capture module, the printer controller receiving said formatted data from the image capture module.

6. The system of claim 1 in which the printhead is a full color printhead.

7. The system of claim 6 in which said printhead is a photo quality color printhead.

8. The system of claim 7 in which the printhead is an ink jet printhead.

9. The system of claim 1 in which the printhead comprises an array of nozzles, said array being fabricated by microelectromechanical techniques.

10. The system of claim 1 which includes a communications module which communicates with the data capture module for enabling captured data to be sent to a remote location.

11. The system of claim 10 in which the communications module also communicates with the data generating module for enabling the data generating module to generate data from a remote supplier of the data.

12. An in-vehicle information retrieval system incorporated in an entertainment unit of the vehicle the in-vehicle entertainment unit including:
- an onboard image viewing facility;
- a control means of the system associated with the image viewing facility for controlling data displayed on the image viewing facility; and
- an onboard printing module of the system connected to the image viewing facility, the printing module comprising a pagewidth printhead for enabling an image to be printed,
- wherein the control means includes a user terminal operable by a user to cause the image to be captured on demand and means for applying supplemental information regarding the captured image data onto the image data for printing by the printing module.

13. An in-vehicle information retrieval system incorporated in an entertainment unit of the vehicle the in-vehicle entertainment unit including:
- an onboard image viewing facility including an image output module and a display means for viewing the images;
- an image capture module of the system, in communication with the image viewing facility, the image capture module including a data compression means for compressing data relating to a captured image into a suitable format for printing, the compressed data including supplemental information regarding the captured image data; and
- an onboard printing module of the system connected to the image capture unit, the printing module comprising a pagewidth printhead for enabling said captured image to be printed together with said supplemental information,
- wherein the image capture module includes a unit terminal operable by a user to cause an image to be captured on demand.

14. The system of claim 13 which includes a wireless communications module connected to the image capture module for sending said captured image to a remote location.

15. The system of claim 14 in which the wireless communications module is also connected to the image viewing facility for enabling video images to be downloaded from a remote supplier of said video images.

* * * * *